United States Patent

Reader, Jr.

[11] Patent Number: 5,973,299
[45] Date of Patent: Oct. 26, 1999

[54] SYSTEM AND METHOD FOR HEATER CONTROL FOR EVAPORATION OF CRYOGENIC FLUIDS FOR COOLING SCIENTIFIC INSTRUMENTS

[75] Inventor: John R. Reader, Jr., Newark, Del.

[73] Assignee: TA Instruments, Inc., New Castle, Del.

[21] Appl. No.: 08/927,879

[22] Filed: Sep. 11, 1997

Related U.S. Application Data

[60] Provisional application No. 60/031,788, Nov. 1, 1996.

[51] Int. Cl.$^6$ ........................................................ H05B 1/02
[52] U.S. Cl. ........................ 219/486; 219/485; 219/506; 219/497; 219/508; 374/11; 374/31
[58] Field of Search ..................................... 219/497, 499, 219/501, 483–486, 508, 506; 374/11, 33, 31, 12; 323/235, 236

[56] References Cited

U.S. PATENT DOCUMENTS

| | | |
|---|---|---|
| 3,339,398 | 9/1967 | Barrall, II et al. . |
| 3,353,002 | 11/1967 | Macoicz et al. ........................ 219/321 |
| 3,456,490 | 7/1969 | Stone et al. . |
| 3,572,084 | 3/1971 | May . |
| 4,031,740 | 6/1977 | Achermann . |
| 4,695,708 | 9/1987 | Schreder .................................. 219/486 |
| 4,783,174 | 11/1988 | Gmelin et al. . |
| 4,979,896 | 12/1990 | Kinoshita . |
| 5,053,604 | 10/1991 | Escarvage et al. ...................... 249/483 |
| 5,117,639 | 6/1992 | Take . |
| 5,293,028 | 3/1994 | Payne ....................................... 219/486 |
| 5,658,480 | 8/1997 | Tennant et al. .......................... 219/519 |

OTHER PUBLICATIONS

J.G. Van–de–Velde et al., "A Novel Approach to Precision Controlled Cooling of a Differential Scanning Calorimeter," Thermochimica Acta, 214 (1993) 163–170.

*Primary Examiner*—Mark Paschall
*Attorney, Agent, or Firm*—Crowell & Moring LLP

[57] ABSTRACT

A heater controller for allocating heaters to cool a thermal chamber of a scientific instrument evaporates cryogenic liquid to produce a coolant gas. The gas is injected into a chamber to cool a sample disposal therein. The controller allocates low-capacity heaters in compliance with IEC guidelines to prevent problems generally associated with switching of large current loads, such as heaters. In one embodiment, heaters are activated so as to avoid jump discontinuities by effectively averaging the power delivered by the heaters. A second embodiment reduces complexity by essentially disregarding the problem of the jump discontinuity. A third embodiment groups the heaters according to a binary grouping scheme. The heater controller of the present invention can be used to control temperature according to a user supplied temperature profile.

21 Claims, 5 Drawing Sheets

SYSTEM AND METHOD FOR HEATER CONTROL FOR EVAPORATION OF CRYOGENIC FLUIDS FOR COOLING SCIENTIFIC INSTRUMENTS

This present application claims the benefit of the earlier filing date of U.S. Provisional Application Ser. No. 60/031,788, filed on Nov. 1, 1996.

BACKGROUND

1. Field of the Invention

The present invention relates to cooling a scientific instrument using cryogenic liquids. More specifically, the present invention relates to a heater control system that generates a coolant gas by boiling a cryogenic liquid to cool a sample disposed in a thermal chamber of an instrument.

2. Related Art

Scientific instruments are often used to study the properties of materials at low temperatures. One method for achieving the low temperatures is to evaporate a coolant gas from cryogenic fluid. This is accomplished using heaters immersed in the cryogenic fluid. The coolant gas is subsequently injected into the instrument to achieve the desired low temperatures. The amount of cooling is determined by the amount of cryogenic fluid evaporated to produce the coolant gas. The greater the amount of heat generated by the heaters, the greater the among of coolant gas produced, and correspondingly, the greater the cooling effect. The amount of heat generated by the heaters is determined by the amount of alternating electrical current supplied to the heaters.

It is well known in the art to use a triode AC switch (triac) to control the supply of alternating electrical current to heaters, lights, and other such devices. A triac produces current for a fraction of the time according to the application pulses to a triac activation gate. It can be used in two different modes, phase angle firing and time proportioning. In the phase angle firing mode, the triac activation gate pulses are controlled so that the triac conducts during a portion of each AC half cycle and is left off for the remainder of each half cycle. The current delivered is a function of the fraction of the cycle that the triac conducts. In the time proportioning made, the triac is switched on for an entire cycle. However, the triac is only switched on a fraction of the total number of available power cycles. The current delivered is proportional to the fraction of the available power cycles that the triac conducts.

There are significant problems associated with switching large current, such as those required for heaters. One problem is the disturbance to nearby electronic circuits caused by the switching. For example, lights may flicker as the large currents are switched in and out. Moreover, phase angle firing creates harmonics on an AC power supply which can cause noise bursts that adversely affect other electronic equipment on the same supply. Because of these undesirable effects, regulatory agencies such as the International Electrotechnical Commission (IEC) have imposed limits on how rapidly the loads may be controlled using switching devices such as triacs. However, because triacs are simple, inexpensive and reliable devices, they are widely used.

Thus, there is a need for a controller that can control switching of load in an IEC compliant manner, while delivering sufficient power that is required in more power intensive applications such as heater controllers. For example, such a controller is desirable to provide current to heaters in thermal analysis instrumentation that provide desired cooling environments for low temperature studies.

SUMMARY OF THE INVENTION

The present invention solves the problem that are associated with switching large loads rapidly by using smaller loads whose net effect, when combined, is substantially the same as a larger load. Thus, the present invention activates smaller loads that have an aggregate effect equaling a desired larger load.

In the preferred embodiment, the loads are heaters such as those used to heat cryogenic fluids in scientific instrument. The heated cryogenic fluid evaporates, thereby creating a coolant gas. The coolant gas achieves a desired cooling effect so that properties of a sample can be measured at low temperatures. The heaters are disposed in the cryogenic fluid. AC electrical current applied to the heaters causes the cryogenic fluid to evaporate, producing the coolant gas. For example the heating system of the scientific instrument may inject the coolant gas into the sample chamber of the instrument to cool the sample.

Three embodiments of the present invention are disclosed. It would, however, be within the skill of those in the art to implement other designs that fall within the scope and spirit of the present invention. Each of the embodiments incorporates a heater controller that sends control signals to heater control elements to allow a desired amount of AC electrical current to reach the heaters. Preferably, the heater control elements are triacs. In addition, each of the first and second embodiments uses at least one low-capacity heater and at least one high-capacity heater. The high-capacity heater can be created by the combination of low-capacity heaters. Thus, a system can be designed using only low-capacity heaters. In such a system, however, there is at least one combination of low-capacity heaters that is functionally equivalent (delivers substantially the same amount of power) to a high-capacity heater.

The low-capacity heaters are switched often and must therefore conform to the loading specifications of the IEC. The high-capacity heaters are not switched as often, and therefore do not have to conform to the IEC standard.

In a first embodiment of the present invention, the heater controller rotates activation of both the low capacity heaters and the high-capacity heaters. The rotation effectively averages the outputs of the low-capacity heaters and the high-capacity heaters. The averaging serves to remove jump discontinuities that can occur if the heaters are not alternated. Heaters are activated on a least-recently-used basis. That is, the least recently used of the low-capacity heaters is activated when a low-capacity heater is required and the least-recently-used high-capacity heater is activated when a high-capacity heater is required.

In a second embodiment of the present invention, jump discontinuities are not accounted for. Rather, the heater controller of the second embodiment activates low and high-capacity heaters as needed. The order of heater activation is always the same. Therefore, there is no effective averaging of the power supplied in the heaters.

In a third embodiment of the present invention, the heaters are grouped for activation according to a binary counting scheme. Thus, the first group has one heater, the second group has two heaters, the third group has four heaters, and so on. Alternatively, single heaters could be used in place of the groups. However, in the third embodiment additional care must be used to avoid violating the IEC loading standard.

In each embodiment, time-proportioning is used to provide current to the heaters. Thus, fractional power requirements are obtained by activating a low-capacity heater for a fractional portion of available power cycles. For example, assume that the high-capacity heaters nominally deliver 200 W of power and the low-capacity heaters nominally deliver 100 W of power. If a power of 360 W is desired, one high-capacity heater and one low-capacity are activated, yielding 300 W. In addition, one low-capacity heater is activated during 60 per cent of the available power cycles, yielding an additional 60 W. Note that in the first embodiment, activation of the heaters is alternated on each power cycle.

The heater controller of the present invention is described in greater detail in the detailed description of the invention, the appended drawings, and the attached claims.

DETAILED DESCRIPTION OF THE PREFERRED EMBODIMENTS

Figure 1:
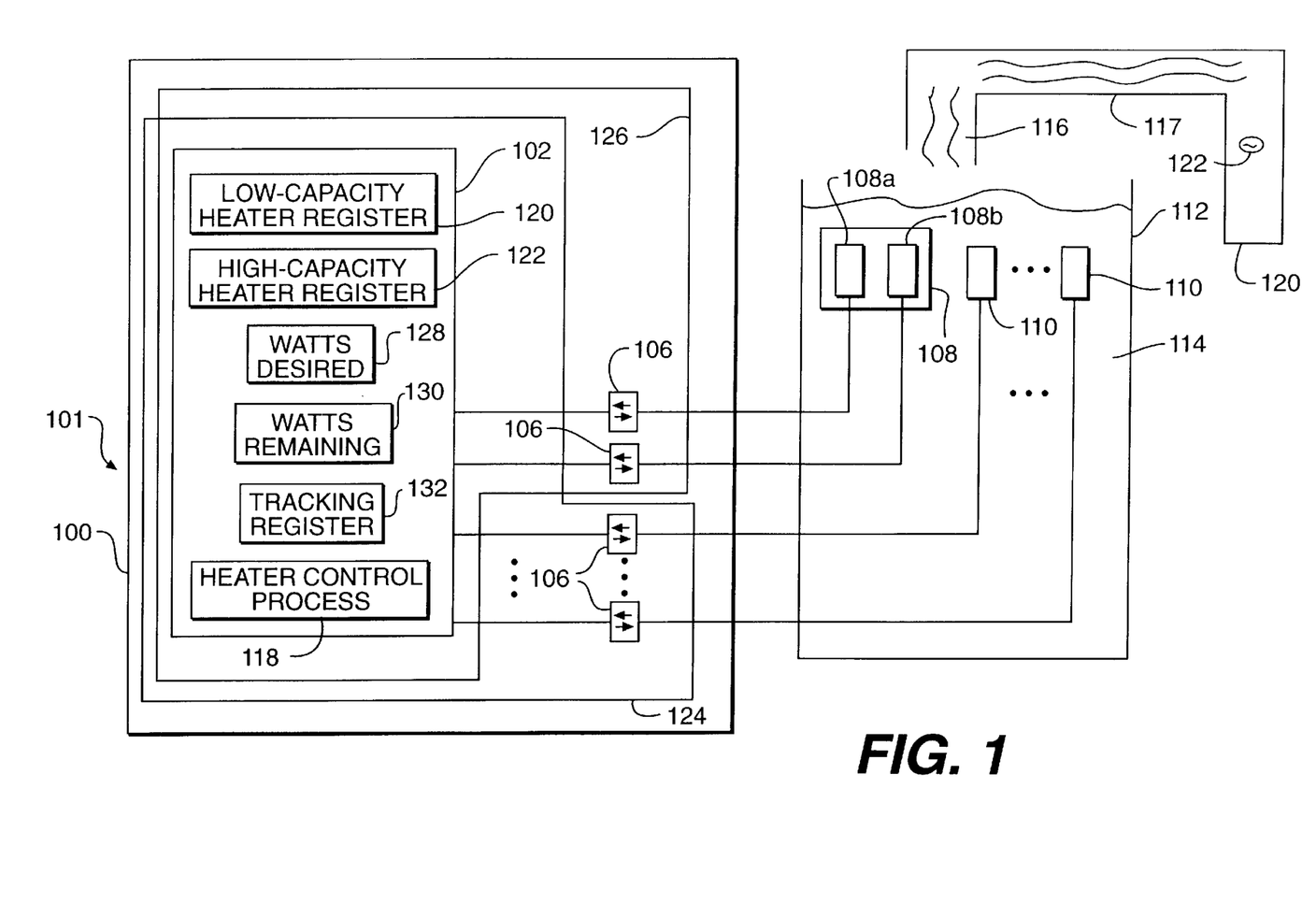
FIG. 1 is a schematic of a heater controller according to the first and second preferred embodiments of the present invention.

FIG. 1 is a schematic of a system 101 incorporating a heater controller 100 according to the first and second preferred embodiments of the present invention. The heater controller 100 preferably includes a microprocessor 102 having heater control process software 118. Software 118 controls one or more heater control elements 106. The one or more heater control elements 106 in turn control one or more low-capacity heaters 108 and one or more high-capacity heaters 110. The heaters 108 and 110 are disposed in a dewar 112 having a cryogenic fluid 114 stored therein. When current is supplied to the heaters 108 and 110, the heaters 108 and 110 deliver power in the form of heat. The heat causes some of cryogenic fluid 114 to evaporate, thereby generating a coolant gas 116. The coolant gas 116 is expelled from the dewar 112 through a tube 117 to an instrument cooling chamber 120. The ejected coolant gas 116 cools a sample 122 disposed in the cooling chamber 120.

The low-capacity heaters 108 are preferably 100 W heaters and the high-capacity heaters 110 are preferably 200 W heaters. For example, heaters commercially available from Watlow, Inc., located in St. Louis, Mo., having model number E3A48, can serve as heaters 108 and 110. The 200 W heaters can be formed from a combination of other heaters. For example, two 100 W heaters can be combined to form a 200 W heater. The cryogenic fluid 114 is preferably liquid nitrogen.

The heater controller 100 of the present invention uses control elements 106 to control the amount of AC electrical current supplied to the heaters 108 and 110 to produce a desired cooling temperature and/or a desired cooling rate. The amount of cooling is proportional to the amount of coolant gas 116 generated by evaporation of cryogenic fluid. The amount of heat generated by the heaters 108 and 110 is proportional to the amount of AC electrical current flowing through the heaters. The more power is dissipated in heaters 108 and 110, the more cryogenic fluid is evaporated, and the greater the cooling. The heater controller 100 of the present invention controls the power control elements 106 to vary the AC electrical current to their corresponding heaters 108 and 110 by determining the number of power cycles in a given time period that AC electrical current reaches the heater.

A first preferred embodiment of the present invention minimizes the effect of jump discontinuities that occur when heaters having similar specifications perform differently in operation. For example, one heater 108 having a 100 W power delivery specification may only deliver 97 W of power in operation, and a second heater 108 also having a 100 W power delivery specification may deliver 102 W in operation. If the first heater is always used until the heating demand is greater than 100 W, and then the heater controller 100 switches in the second heater 108, there is a potential for the heater controller 100 to become unstable due to the difference between the heater power outputs. This is because there is not a smooth transition in heater power delivered between the two heaters 108, but, rather a jump discontinuity in heating across the 100 W threshold. The first preferred embodiment minimizes this jump discontinuity by effectively averaging the power output of the heaters.

A second preferred embodiment of the present invention does not so account for the jump discontinuity, because it does not effectively average the power output of the heaters. Thus, the second preferred embodiment is less complex than the first preferred embodiment. But, the reduced complexity comes at the expense of increased instability in the heater controller 100 due to jump discontinuities.

The third preferred embodiment of the present invention, which also does not account for jump discontinuities, uses a binary grouping of heaters 108 and 110 to facilitate control.

The first and second preferred embodiments of the present invention both use an architecture similar to that illustrated in FIG. 1 The difference resides primarily in the heater control process software 118 executing in the microprocessor 102. Referring to FIG. 1, each embodiment includes preferably two low-capacity heaters 108 and three high-capacity heaters 110. Thus, the total heater power delivery of the system ranges from 0 W to 800 W. The architecture for the third preferred embodiment is described below with reference to FIG. 4.

As described above, the heater controller 100 of the first preferred embodiment effectively averages the power delivered by the low-capacity heaters 108. Similarly, the heater controller 100 of the first preferred embodiment effectively averages the power delivered by the high-capacity heaters 110. The heater control process software 118 accomplishes the desired effective averaging of heater power delivery by alternating heater use. The heater control process software 118 alternates heater use by keeping track of the most recently used low-capacity heater 108 and the most recently used high-capacity heater 110. By so tracking the most recently used heaters 108 and 110, the heater controller 100 can activate the next heater in a rotation. Preferably, the rotation is designed such that the next heater used is the least recently used heater 108 or 110. Alternating heater activation effectively averages the power output of the heaters. That is, any difference in heater output is effectively averaged by alternating heater use. The averaging removes the jump discontinuity that would otherwise result through repeated application of the same sequence of heaters by providing a smooth transition between heaters having similar specifications but varying operation.

In the first preferred embodiment, the heaters are alternated on a least recently used basis. That is, the heater next applied is the heater that has been idle the longest. The heater controller 100 rotates activation of both the low-capacity heaters 108 and the high-capacity heaters 110.

The heater controller 100 contains two storage registers 120 and 122 that monitor which heater should be next applied. Storage register 120 tracks the most recently used low-capacity heater 108. Storage register 122 tracks the most recently used high-capacity heater 110. Because the heater least recently used is indicated by a one up count from the most recently used heater, the preferred embodiment stores a value that represents most recently used heaters 108 and 110 in the heater registers 120 and 122 respectively. To determine the least recently used heater 108 or 110, the heater controller 100 adds one (as described below) to the value stored in the respective storage register 120 or 122.

Figure 2:
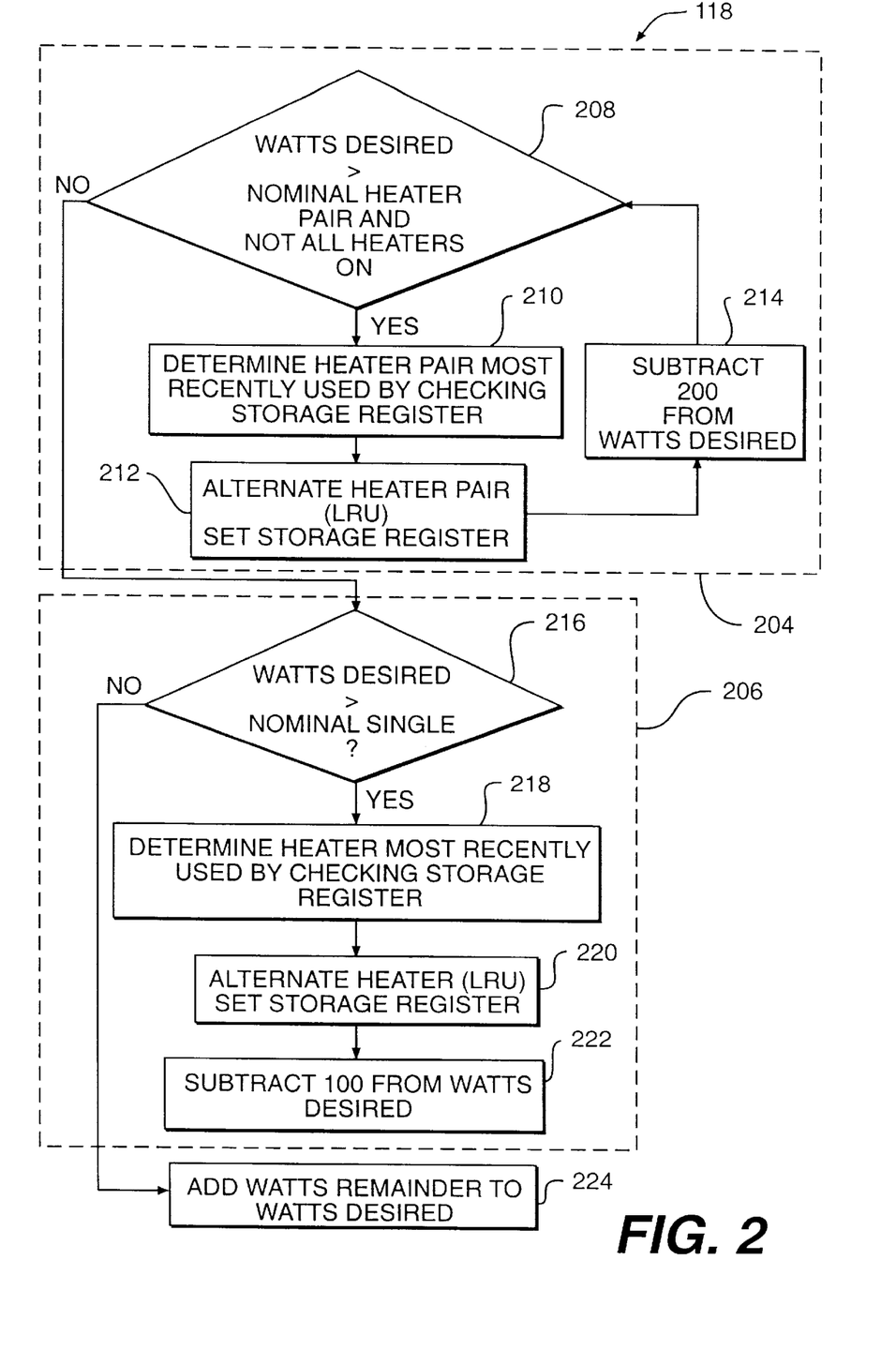
FIG. 2 is a flow chart for a heater control process according to the first embodiment of the present invention.

FIG. 2 is a flow chart 202 representative of the heater control process 118 that executes in the microprocessor 102 of the heater controller 100 according to the first preferred embodiment of the present invention. It would be apparent to those skilled in the art how to write software for a variety of computing platforms based on the functional description provided in the flow chart 202 presented in FIG. 2.

FIRST PREFERRED EMBODIMENT

Referring to FIGS. 1 and 2, the heater control process 118 of the heater controller 100 for the first preferred embodiment is explained. The heater control process 118 includes two main control loops 204 and 206. A first control loop 204 controls activation of the high-capacity heaters 110. The control loop 204 includes steps 208–214. The control loop 204 is alternately referred to herein as the high-capacity heater control loop 204. The high-capacity heater control loop 204 can be thought of as part of a high-capacity heater controller 124 that includes the microprocessor 102 and the heater control elements 106h corresponding to the high-capacity heaters.

A second control loop 206 controls allocation of the low-capacity heaters 108. The control loop 206 includes steps 216–222. Control loop 206 is also referred to herein as the low-capacity heater control loop 206. Low-capacity heater control loop 206 can be thought of as part of a low-capacity heater controller 126 that includes the microprocessor 102 and the heater control elements 106 corresponding to the low-capacity heaters. As described above, both the high-capacity heater control loop 204 and the low-capacity heater control loop 206 preferably execute in the microprocessor 102 as part of the heater controller 100.

The heater controller 100 first allocates high-capacity heaters 110 in high-capacity heater controller 124. Referring to FIG. 1, high-capacity heater controller 124 begins in step 208. In step 208, high-capacity heater controller 124 determines whether a desired power is greater than that delivered by a nominal high-capacity heater 110. If so, a high-capacity heater 110 must be turned on to provide additional heat. Which high-capacity heater 110 is to be turned on is determined by reference to the high-capacity heater storage register 122. In the first preferred embodiment, the next high-capacity heater 110 to be activated is the high-capacity heater 110 that was least recently used.

The least recently used high-capacity heater 110 is preferably determined by adding one to the value stored in the most recently used high-capacity heater register 122. The addition is performed in a modulo-n fashion, where n is the number of high-capacity heaters 110 in the system. It would be apparent that any method of determining the least recently used heater can be used. Other such methods would be known to those skilled in the art. Moreover, the present invention is not limited to activating heaters on a least recently used basis to achieve the desired averaging effect described above. For example, activation of the heaters can be randomized. Other such methods for activating the heaters to achieve the desired averaging effect would be known to those skilled in the art.

High-capacity heater controller 124 makes an additional determination in step 208. The additional determination is whether all of the high-capacity heaters 110 are activated. If all of the high-capacity heaters 110 are activated and the desired power is greater than that of the nominal high-capacity heater, there is a potential error condition. Though not illustrated in FIG. 2, notification of such an error condition to a system user can be performed in a well-known manner. Alternatively, no error condition is reported and high-capacity heater controller 124 continues by supplying AC electrical current to all heaters to supply the maximum power capacity for the system.

If the desired power is greater that the nominal high-capacity heater and not all of the high-capacity heaters have been activated, high-capacity heater controller 124 continues in step 210. In step 210, high-capacity heater controller 124 checks the most recently used high-capacity heater register 122 to determine the next high-capacity heater 110 to activate. As described above, the preferred embodiment makes this determination on a least recently used basis. In step 212, high-capacity heater controller 124 sends a signal to high-capacity heater 110, thereby activating heat-capacity heater 110. In addition, high-capacity heater controller 124 updates high-capacity heater storage register 122, by setting the value in the high-capacity storage register 122 to the high-capacity heater 110 selected according to the least recently used criterion.

High-capacity heater controller 124 then continues in step 214. In step 214, high-capacity heater controller 124 updates the desired heater power in the watts desired register 128 by subtracting the nominal power delivered by a high-capacity heater 110 from the value stored therein. This reflects that an additional high-capacity heater 110 has been added. Preferably, a high-capacity heater 110 nominally delivers a power of 200 W.

High-capacity heater controller 124 repeats the high-capacity heater control loop 204 until the desired power stored in the watts desired register 128 is less than the nominal power that is delivered by a high-capacity heater 110. Heater controller 100 then executes the low-capacity heater control loop 206. The low-capacity heater controller 126 operates in a manner analogous to that of the high-capacity heater controller 124.

The low-capacity heater controller 126 begins in step 216. In step 216, the low-capacity heater controller 126 determines whether the remaining wattage required in the watts desired register 128 is greater than the power nominally delivered by a low-capacity heater 108. If the value in the watts desired register 128 is greater than the power nominally delivered by a low-capacity heater 108, the low-capacity heater controller 126 determines which of the low-capacity heaters to activate. Analogous to the high-capacity heater controller 124, the low-capacity heater controller 126 makes the determination on a least recently used low-capacity heater 108 basis. Thus, the low-capacity heater controller 126 queries the low-capacity heater most recently used register 120 and switches heaters in accordance with the value in the register 120. Because there are preferably two low-capacity heaters 108 in the first preferred embodiment the low-capacity heater controller 126 need only toggle between the two low-capacity heaters 108. Such toggling is well-known in the art and can be accomplished for example, by changing the state of a toggle flip-flop (not shown). Alternatively, the heater controller 100 can determine the least recently used low-capacity heater 108 by modulo-2 addition of the value one to the storage register 120. As is well-known in the art, one way to accomplish such modulo-2 addition is to add one to the value stored in the register 120 and test the least significant bit.

Although only two low-capacity heaters 108 are described in the first preferred embodiment, the invention is not so limited. Where more than two low-capacity heaters 108 are implemented, the determination as to which low-capacity heater 108 to next activate can be performed using modulo-n addition, where "n" represents the number of low-capacity heaters 108. It would be apparent to those skilled in the art that other mechanisms for determining the next low-capacity heater 108 could be employed. For example, the low-capacity heater controller 126 could activate low-capacity heaters 108 in a random manner. One example in which more than two low-capacity heaters 108 are used is where the low-capacity heater 108 are activated in pairs to effectuate a high-capacity heater 110.

Once the low-capacity heater controller 126 has determined the next low-capacity heater 108 to activate, the low-capacity heater controller 126, in step 222, subtracts the power nominally delivered by a low-capacity heater 108 from the value stored in the watts desired register 128. The subtraction indicates that an additional low-capacity heater 108 has been activated. Thus, that amount of power no longer needs to be supplied by the low-capacity heaters 108. The low-capacity heater controller 126 repeats the low-capacity heater control loop 206 until all low-capacity heaters 108 in the system have been activated or the value in the watts desired register 128 is less than the power nominally delivered by a low-capacity heater 108.

If in step 216, the low-capacity heater controller 126 determines that the remaining watts desired stored in the watts desired register 128 is less that the power nominally delivered by a low-capacity heater 108, the low-capacity heater controller 126 exits the low-capacity heater control loop 206. Upon exit, any remaining value in the watts desired register 128 is stored in the watts remaining register 130. The value stored in the watts remaining register 130 is added to the watts desired value for the next iteration of the heater control loop 202 to produce a sum. The heater controller 100 stores the resulting sum in the watts desired register 128 prior to repeating the heater control process 118 illustrated in the flow chart 202. The watts desired value for the next interaction of the heater-control process 118 can be entered by the user initially or can be determined via programmed control.

As in the case of the high-capacity heater control loop 204, activating the low capacity heaters 108 according to the low-capacity heater control loop 206 ensures that the low-capacity heaters 108 deliver power for the correct fraction of cycles to provide the desired power. For example, if a power of 75 W is desired, the low-capacity heater controller 126 will ensure that a low-capacity heater 108 is activated three out of every four power cycles. Continuing the example, in the first power cycle, the heater controller 100 initially stores the value 75 in the watts desired register 128. Because 75 W is less than the amount of power that can be supplied nominally by a high-capacity heater 110 and that supplied by a low-capacity heater, the heater controller 100 skips both the high-capacity heater control loop 204 and the low-capacity heater control loop 206. Because 75 W is the desired power, 75 is added to the value stored in the watts desired register 128, leaving a value of 150 in that register. Because the value in the watts desired register 128 is now 150, the heater controller skips the high-capacity heater control loop 204, but applies the low-capacity heater control loop 206. The low capacity heater controller 126 activates the next low-capacity heater 108 during power cycle 2.

As described above, the next low-capacity heater 108 to be activated is determined by the low-capacity heater register 120 according to at least recently used paradigm. Upon activating the appropriate low-capacity heater 108, the low-capacity heater controller 126 subtracts the nominal power supplied by a low-capacity heater 108 from the watts desired register 128. Preferably, the nominal power supplied by a low-capacity heater is 100 W. Thus, the subtraction leaves 50 W in the watts desired register. The foregoing process repeats in power cycles 3 and 4. In both power cycles the value in the watts desired register 128 is such that a low-capacity heater 108 will be activated in accordance with the low-capacity heater register 120. The subtraction at the end of power cycle 4 leaves the value 0 in the watts desired register 128. Thus, when the value 75 is added to the value 0 in the watts desired register 128, the watts desired register 128 stores the value 75. Because 75 is not greater or equal to the nominal power of the low-capacity heaters 108 in the preferred embodiment (100 W), no low-capacity heater 108 will be activated. As just described, therefore, a low capacity heater 108 is activated 3 out of 4 power cycles, thereby supplying an effective power of 75 W. Because the heater application is rotated, any difference in power between them, is affectively averaged out.

SECOND PREFERRED EMBODIMENT

The second preferred embodiment for the present invention does not account for possible jump discontinuities in the heater control process. Rather, the heater controller 100 simply adds the next available heater as required. There is no provision for alternating the heaters as was done in the first preferred embodiment. Thus, the second preferred embodiment trades off control accuracy for simplicity.

Figure 3:
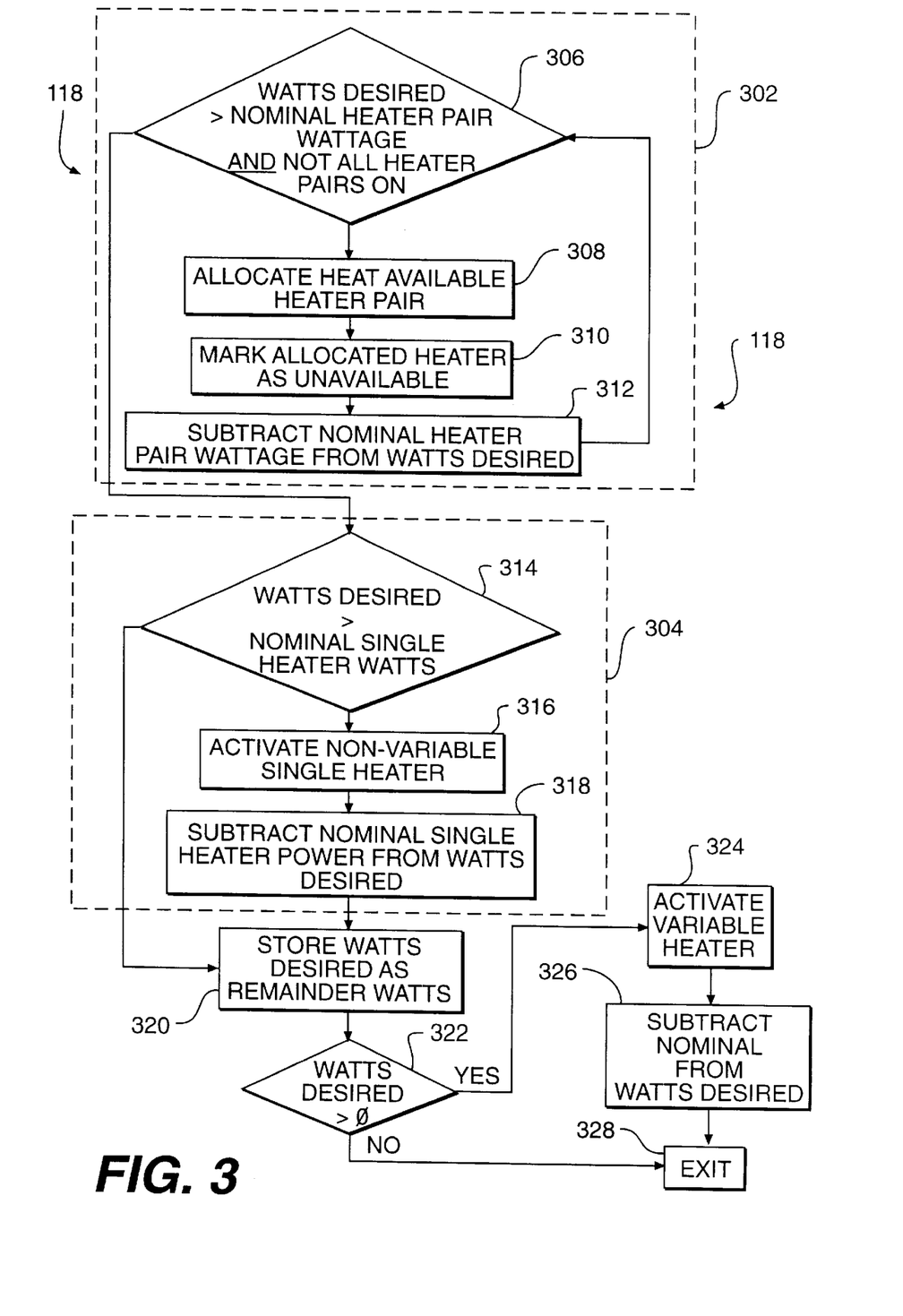
FIG. 3 is a flow chart for a heater control process according to the second embodiment of the present invention.

FIG. 3 is a flow chart illustrating the heater control process 118 according to the second preferred embodiment of the present invention. The heater control process 118 executes in the microprocessor 102 of the heater controller 100. The heater control process 118 of the second preferred embodiment has two main control loops. A first control loop is a high-capacity heater control loop 302 that preferably executes in a high-capacity heater controller 124. The high-capacity heater controller 124 includes the microprocessor 102 and the control elements 106 that control the high-capacity heaters 110. The high-capacity heater control loop 302 includes steps 306–312.

The second control loop is a low-capacity heater control loop 304 that preferably executes in a low-capacity heater controller 126. The low-capacity heater controller 126 includes the microprocessor 102 and the heater control elements 106 that control the low-capacity heaters 108. The low-capacity heater control loop 304 includes steps 314–320.

In the second preferred embodiment, one of the low-capacity heaters 108a is referred to as a non-variable low-capacity heater. The other low-capacity heater 108b is referred to as a variable low-capacity heater. While there can be multiple low-capacity heaters 108a in the second preferred embodiment, there is preferably only one variable low-capacity heater 108b. The low-capacity heater control loop 304 includes steps 314–320. Both the high-capacity heater controller 124 and the low-capacity heater controller 126 are part of the heater controller 100.

Referring to FIGS. 1 and 3, the heater control process 118 according to the second preferred embodiment begins by executing the high-capacity heater controller 124 to allocate any required high-capacity heaters 110. The heater control process 118 then executes the low-capacity heater controller 126 to allocate the low-capacity heaters 108 as required.

The high-capacity heater controller 124 begins in step 306. In step 306, the high-capacity heater controller 124 determines whether the value of the watts desired register 128 is greater than the power nominally supplied by a high-capacity heater 110. If the value of the watts desired register 128 is less than the power nominally supplied by a high-capacity heater 110, the high-capacity heater controller 124 exits the process 302 it is running and passes control to the low-capacity heater controller 126, described below.

If the value of the watts desired register 128 is greater than or equal to the power of a nominal high-capacity heater, the high-capacity heater controller 124, in step 308, allocates the next available high-capacity heater 110. The high-capacity heater controller 124 then marks the allocated heater 110 as unavailable in step 310. In step 312, the high-capacity heater controller 124 then subtracts the power nominally delivered by a high-capacity heater 110 from the value stored in the watts desired register 128.

In step 306, the high-capacity heater controller 124 also determines if all of the high-capacity heaters 110 have been allocated. If all of the high-capacity heaters 110 have been allocated then no more can be allocated and the high-capacity heater control loop 302 exits. The heater controller 124 then continues with the low-capacity heater controller 126.

The low-capacity heater controller 126 begins in step 314. In step 314, the low-capacity heater controller 126 determines whether the value stored in the watts desired register 128 is greater than the power nominally supplied by a low-capacity heater 108. If the value stored in the desired watts register 128 is less than the power nominally supplied by a low-capacity heater 108, the low-capacity heater controller 126 terminates execution of its control process 304. The heater control process 100 then continues in step 320 as described below.

If the value stored in the watts desired register 128 is greater than or equal to the power nominally supplied by a low-capacity heater 108, the low-capacity heater controller 126 activates the non-variable low-capacity heater 108a in step 316. The low-capacity heater controller 126 then continues in step 318, where the low-capacity heater controller 126 subtracts the power nominally supplied by a low-capacity heater 108 from the value of the watts desired register 128 and stores the result back into the watts desired register 128.

If the value of the watts desired register 128 is less than the nominal power of a low-capacity heater or the low-capacity heater controller 126 completes execution of step 318, the low-capacity heater controller 126 exits the loop 304. The heater control process 118 then continues in step 320. At this point, the value of the watts desired register 128 represents the remaining value after application of the heaters 108 and 110 as described above with respect to the high-capacity heater control loop 302 and the low-capacity heater control loop 304. In step 322, the heater controller 100 determines if the value of the watts desired register 128 is greater than 0.

If the value is greater than 0, then the heater controller 100 causes the variable heater 108b to be activated in step 324. The heater controller then, in step 326, subtracts the value of the power nominally supplied by a low-capacity heater 108 from the value of the watts desired register 128, and stores the result in the watts desired register 128. In step 328, the heater controller process exits its execution of the process illustrated in the flow chart in FIG. 3. If, in step 322, the heater controller 100 determines that the value of the watts desired register 128 is less than or equal to 0, the heater controller executes step 328 to terminate the process illustrated in the flow chart in FIG. 3.

It would be apparent to those skilled in the art that the present invention, is scalable to supply any heating requirement. That is, more heating pairs can be added as required. The flowcharts of FIGS. 2 and 3 would require minimal modification to implement such scaling. Such modification is within the knowledge of those skilled in the art. Moreover, the present invention contemplates any groupings of heaters. One such grouping is described below with respect to FIG. 4.

THIRD PREFERRED EMBODIMENT

Figure 4:
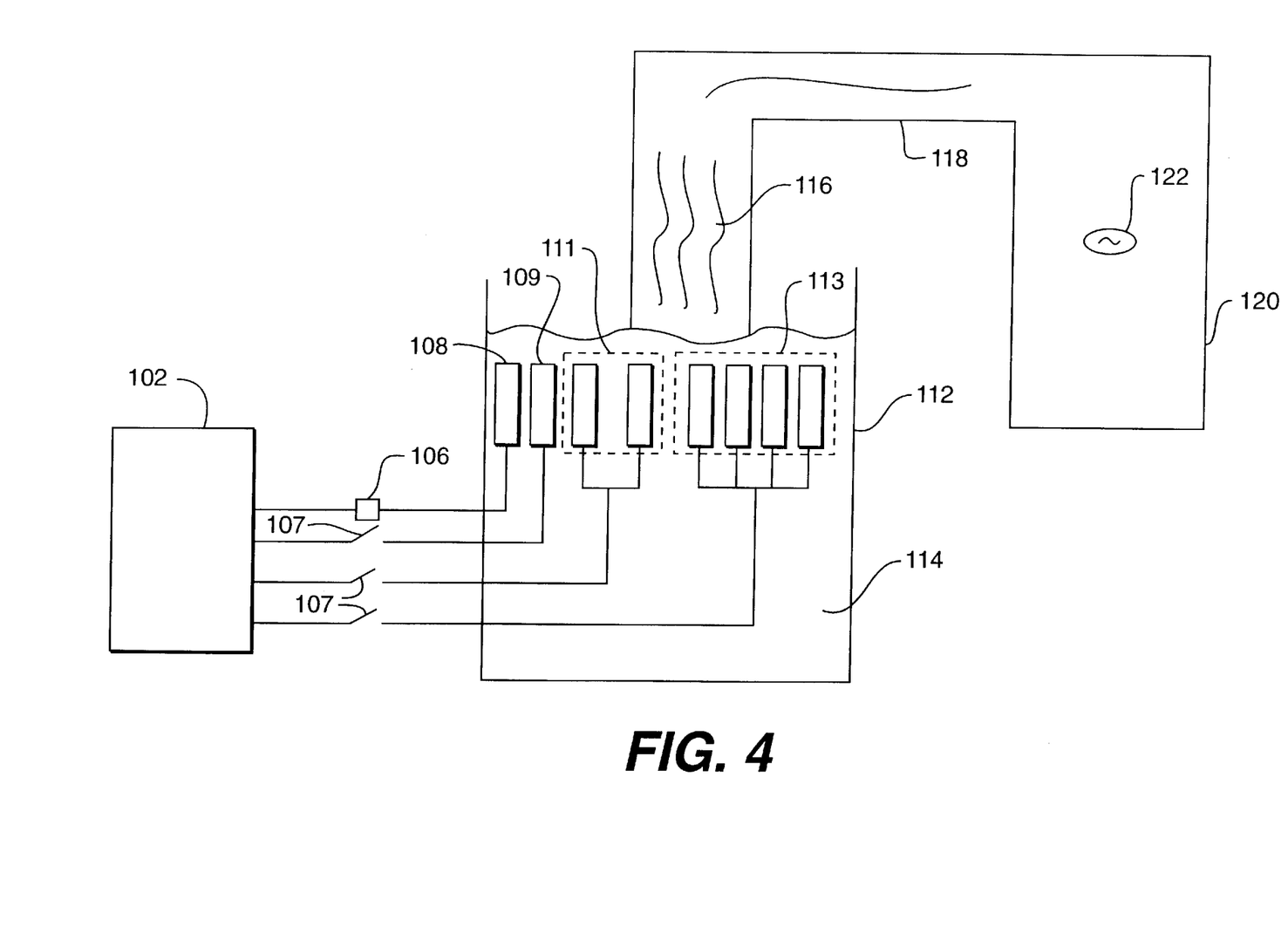
FIG. 4 is a schematic of a heater controller according to the third embodiment of the present invention.

FIG. 4 illustrates a schematic of a third embodiment of the present invention having such alternate groupings of heaters. Preferably, there are N such groups of heaters. In the third embodiment heaters are grouped such that numbers of heaters in each group increases according to a binary count. Preferably, the third embodiment uses only low-capacity heaters 108. Thus, there is one heater in the first group 109; two heaters in the second group 111, and four heaters in the third group 113. The heaters in the first, second and third groups are either all turned on or all turned off by switches 107 if that particular group of heaters is selected. Switches 107 can also be implemented as triacs configured to operate in an "on-off" manner. Alternatively, a low-capacity heater having twice the output capacity of the first group 109 could replace the two heaters of the second group 111. Likewise, a heater having four times the heating capacity of the first group 109 could replace the third group of heaters 113. However, care must be taken to ensure that the power delivery capacity of the heaters conforms to the IEC standard considering the rapid switching of heaters contemplated by the present invention. The third embodiment, like the second, requires an additional variable heater 108. The additional variable heater is used, as before, to provide heat for power requirements that are not a multiple of the power nominally supplied by a low-capacity heater 108.

Figure 5:
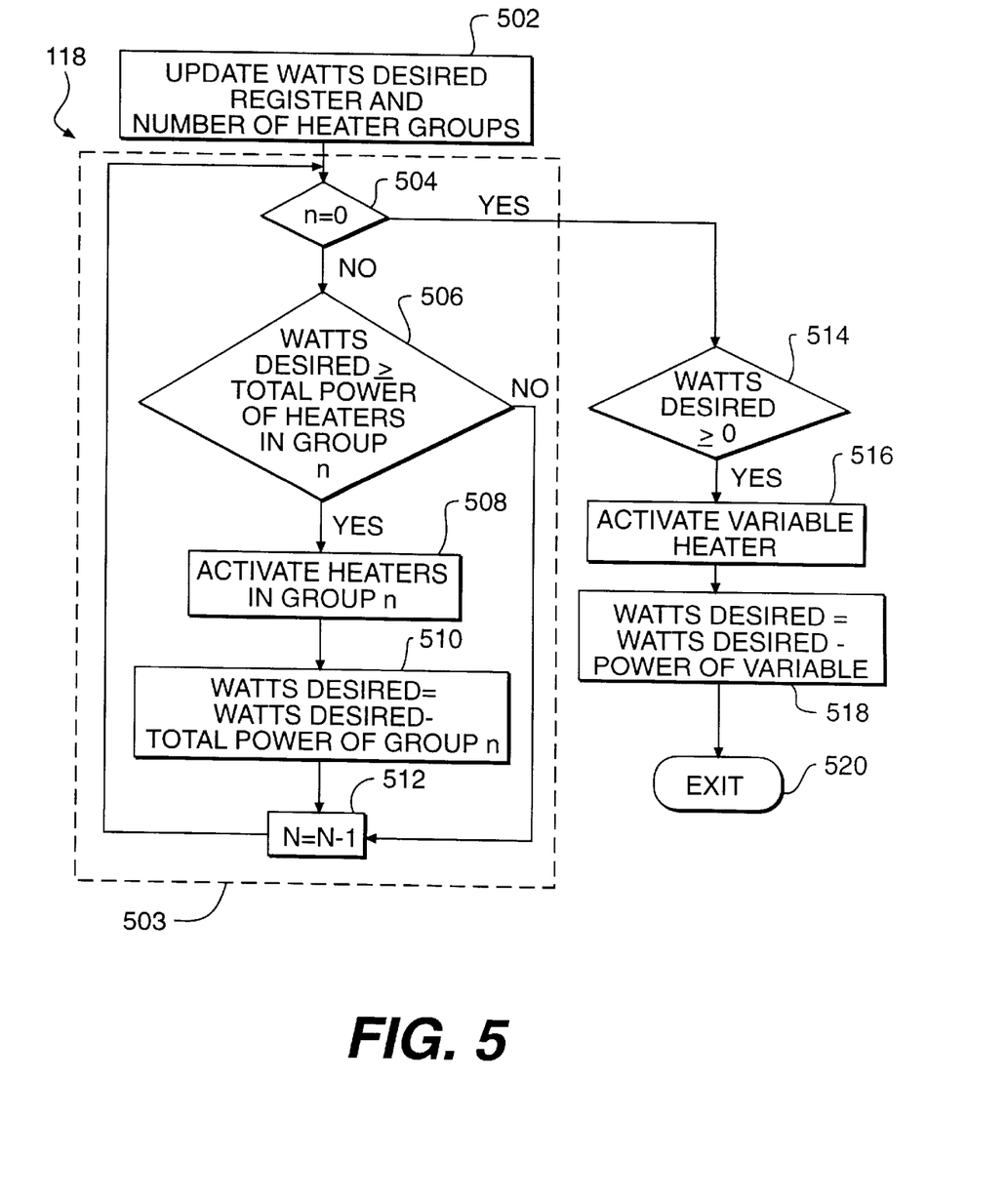
FIG. 5 is a flow chart for a heater control process according to the third embodiment of the present invention.

FIG. 5 is a flow chart representative of the heater controller process 118 that the heater controller 100 executes according to the third embodiment of the present invention. The heater controller begins in step 502 where it updates the watts desired register 128. The heater controller 100 updates the watts desired register 128 by adding the current watts desired (user entered or machine determined as described below) to the current value of the watts desired register 128. The heater controller 100 also initializes a tracking register 132 with the number of heater groups in the third embodiment. As described above, there are preferably N groups. Thus, the heater controller initializes the tracking register 132 to store the value N. Note, that the value of the tracking register 132 indicates the particular heater group being considered in control loop 503 (described below).

The heater controller 100 then executes step 504. Step 504 begins a control loop 503 that allocates the various groups of heaters that are present in the third embodiment of the present invention. Control loop 503 includes steps 504–512. In step 504, the heater controller 100 determines if control loop 503 has been applied to each of the N heater groups in a particular implementation of the third embodiment. In the preferred embodiment, a value of 0 in the tracking register 132 indicates that the loop 503 has been applied to each of the N heater groups. If the value of the tracking register 132 is greater than 0, the heater controller 100 executes step 506 where it determines whether the value of the watts desired register 128 is greater or equal to the total power supplied by the heater group indicated by the value of the tracking register 132. If the watts desired register 128 has a value greater than the power nominally supplied by the group of heaters indicated by the value of the tracking register 132, the heater controller 100 activates the group of heaters whose value is indicated by the tracking register 132 in step 508. The heater controller 100 then continues in step 510 where it subtracts the power nominally supplied by the group of heaters indicated by the value of the tracking register 132. The heater controller 100 then prepares to repeat the loop 503 for the next group of heaters to be considered by decrementing the tracking register 132 by one in step 512. The heater controller 503 then repeats the loop 503.

If the heater controller 100 determines that the value of the watts desired register 128 is less the total power nominally supplied by the group of heaters indicated by the tracking register 132, then that particular group of heaters should not be activated. The heater controller then prepares for consideration of the next group of heaters by decrementing the value of the tracking register 132 by one in step 512. The heater controller 503 then repeats the loop 503.

If the loop 503 has been applied to all of the heater groups, as indicated by a zero value in the tracking register 132, the heater controller 100 continues in step 514. In step 514, the heater controller determines whether the value stored in the watts desired register 128 is greater than zero. If the value stored in the watts desired register is greater than zero, the heater controller activates the variable heater 108b in step 516. The variable heater 108b is used to supply incremental power when the watts desired value is not an even multiple of the nominal power supplied by the smallest group of heaters. In the third embodiment, the smallest group of heaters contains one heater. Then in step 518, the heater controller subtracts the power nominally output by the variable heater from the value of the watts desired register 128, whereupon the heater controller exits the heater control process 118 in step 520. If in step 514, the heater controller 100 determines that the value of the watts desired register 128 is less than or equal to zero, the heater controller 100 exits the heater control process 118 in step 520.

It would be apparent to those skilled in the art that the embodiment of the present invention illustrated in FIG. 4 is scalable as are the other disclosed embodiments. Thus, the next addition of heaters would be eight low-capacity heaters 108, or a high-capacity heater 110 having equivalent capacity. This scaling can be performed for any desired heating.

The heater controller 100 of the present invention, as described in the first, second and third embodiments can be used in a temperature controller. That is, the present invention can be used to track a temperature profile. For example, the microprocessor 102 can be programmed with a desired temperature profile. The temperature profile specifies a desired temperature over time. The heater controller 100 can use the desired temperatures in the temperature profile to control the heaters 108 and 110. To use the temperatures, the heater controller 100 must convert the desired temperature to watts. Such a conversion is well known to those skilled in the art and can be performed in a preferred embodiment by the use of a lookup table (not shown). The lookup table of the preferred embodiment contains pairs of temperatures and watts required to achieve those temperatures. Thus, when a new desired temperature is required by the temperature profile, the heater controller 100 indexes the lookup table by the temperature to get the number of watts required. The heater controller 100 adds the number of watts so obtained to the watts desired register 128 and stores the resulting sum in the watts desired register 128. The heater controller 100 then executes the heater control loop corresponding to the first, second or third embodiment as described above.

For temperature values that fall between those expressly entered in the lookup table, well-known interpolation techniques can be used to estimate the watts required. Such well known interpolation techniques include but are not limited to least square fits, polynomial fits, linear regressions, and cubic splines.

Alternatively, a wattage profile can be specified. In this case no lookup table is required as the watts required are given directly by the wattage profile. In this case, the heater controller 100 obtains the desired watts from the wattage profile, adds it to the value in the watts desired register 128, and stores the resulting sum in the watts desired register 128. The heater controller 100 then executes the heater control loop corresponding to the first, second or third embodiment as described above.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A cooling system, comprising:

a dewar containing a cryogenic liquid;

a microprocessor, comprising a watts-desired register in a value representing a desired heater power delivery is stored;

one or more low-capacity heaters conforming to a loading standard, coupled to said microprocessor through one or more heater control elements, said low-capacity heaters disposed in said cryogenic liquid;

one or more high-capacity heaters coupled to said microprocessor through one or more additional heater control elements, said high-capacity heaters disposed in said cryogenic liquid; and a heater control process controlling said heater control elements to activate said one or more low-capacity heaters and said one or more high capacity heaters according to said value stored in said watts desired register.

2. The cooling system of claim 1, wherein said one or more high-capacity heaters comprise a plurality of low-capacity heaters combined to form said high-capacity heater.

3. The cooling system of claim 1, wherein said heater control elements are triacs.

4. The cooling system of claim 1, further comprising:

a low-capacity heater storage register;

a high-capacity heater storage register; and means for determining a next heater to activate based on a value stored in said low and high-capacity heater storage registers.

5. The cooling system of claim 1, wherein said heater control process stores a value representing the most recently used low-capacity heater in said low-capacity heater storage register, and stores a value representing the most recently used high-capacity heater storage register.

6. The cooling system of claims 5, wherein said next low-capacity heater to activate is the least recently used of the low-capacity heaters and the next high-capacity to be activated is the least recently used of the high-capacity heaters.

7. The cooling system of claim 2, wherein said plurality of low-capacity heaters form groupings of heaters according to a binary count.

8. The cooling system of claim 1, wherein said low-capacity heaters nominally supply 100 W of power.

9. The cooling system of claim 1, wherein said high-capacity heaters nominally supply 200 W of power.

10. A method for controlling activation of a plurality of heaters of heater subsystem in a temperature control system, comprising the steps of:

(a) determining a desired power to be supplied by the heater subsystem;

(b) storing said desired power as a value in a watts desired register;

(c) activating one of the plurality of heaters when the said value is greater than a power nominally supplied by said heater;

(d) subtracting said power nominally supplied by said heater from said value to obtain a result;

(e) storing said result in said watts desired register as a new value; and (f) repeating steps (c) and (d) until either (i) there is no heater of the plurality of heaters that is not activated, or (ii) the value remaining in said watts desired register is less than the power nominally supplied by any of the plurality of heaters.

11. The method of claim 10, wherein said heater subsystem includes at least one low-capacity heater and at least one high-capacity heater, further comprising the steps of:

(g) allocating said at least one high-capacity heater in accordance with steps (c)–(e); and (h) allocating said at least one low-capacity heater according to steps (c)–(e).

12. The method of claim 11, wherein step (h) is performed after step (g).

13. The method of claim 11, further comprising the steps of:

determining a fractional value substantially equal to a quotient resulting from the value stored in the watts desired register divided by the power nominally supplied by a variable heater, said variable heater being one of said plurality of heaters; and activating said variable heater for a portion of the number of power cycles that are available during which to activate said variable heater such that a second quotient equal to said portion of the number of power cycles divided by said total number of power cycles is substantially equal to said first quotient.

14. The method of claim 11, further comprising the steps of:

(i) grouping said heaters into groups having an increasing binary count; and (j) activating said groups of heaters in accordance with steps (c)–(e).

15. A heater controller for controlling AC electrical current supplied to one or more heaters disposed in a dewar containing a cryogenic fluid by sending control signals to one or more heater control elements to conduct a sufficient current to one or more heaters to achieve a desired cooling, comprising:

a microprocessor coupled to the heater control elements to activate said heater control elements to conduct a desired amount of current; and a heater control Process executing on said microprocessor to cause said microprocessor to transmit a control signal to each of said heater control elements to cause current to be conducted to the one or more heaters according to a value stored in a watts desired register such that the activation of the one or more heaters in response to said current conforms with a loading standard; and wherein said one or more heaters include at least one low-capacity heater and at least one high-capacity heater, further comprising:

a dynamic amount of power that is desired for the heaters to deliver, wherein said heater control process comprises:

a low-capacity heater controller to control activation of said at least one low-capacity heater; and a high-capacity heater controller to control activation of said at least one high-capacity heater.

16. The heater controller of claim 15, wherein said at least one high-capacity heater comprises a plurality of low-capacity heaters.

17. The heater controller of claim 15, wherein said low-capacity heater controller further comprises:

(a) determining means for determining if the value stored in said watts desired register is less than a power nominally supplied by a low-capacity heater;

(b) means for sending a first control signal to a first one of said heater control elements to supply current to a first one of said low-capacity heaters when said determining means determines that said value is greater than the power nominally supplied by a low-capacity heater;

(c) means for subtracting the power nominally supplied by a low-capacity heater from said watts desired register to generate a first result;

(d) means for storing said first result in said watts desired register;

(e) means for adding a value representative of a user's desired watts to said watts desired register to generate a second result; and (f) means for storing said second result in said watts desired register.

18. The heater controller of claim 17, wherein said low-capacity heater controller further comprises means for applying means (a)–(e) repeatedly until said value is less than the power nominally supplied by a low-capacity heater.

19. The heater controller of claim 15, wherein said high-capacity heater controller further comprises:
  (a) determining means to determine if said value is greater than or equal to a power nominally delivered by a high-capacity heater;
  (b) means for sending a control signal to one of said high-capacity heaters when said determining means indicates that said value is greater than or equal to the power nominally delivered by a high-capacity heater;
  (c) subtraction means for subtracting the power nominally delivered by a high-capacity heater from said watts desired register to generate a result; and
  (d) means for storing said result in said watts desired register as said value.

20. The heater controller of claim 19, wherein said high-capacity heater controller further comprises:
  means for applying means (a)–(d) repeatedly until said value is less than the power nominally supplied by a high-capacity heater.

21. The heater controller of claim 15, wherein said standard is the IEC standard.

* * * * *